M. T. THOMAS.
SHAFT CLAMP.
APPLICATION FILED JAN. 17, 1908.
907,539.
Patented Dec. 22, 1908.
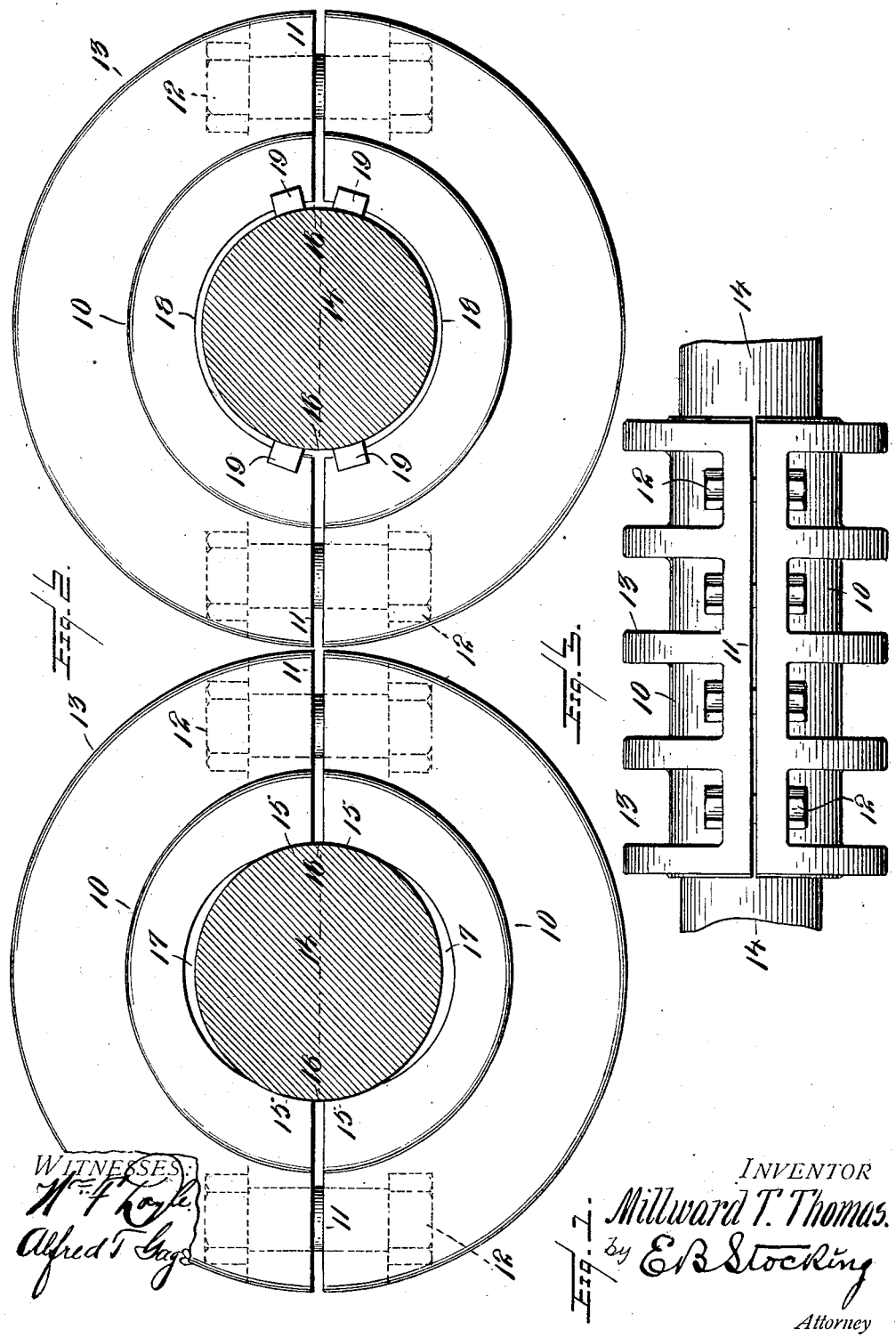
INVENTOR
Millward T. Thomas.
by E. B. Stocking
Attorney

UNITED STATES PATENT OFFICE.

MILLWARD T. THOMAS, OF WARREN, PENNSYLVANIA.

SHAFT-CLAMP.

No. 907,539.     Specification of Letters Patent.     Patented Dec. 22, 1908.

Application filed January 17, 1908. Serial No. 411,271.

*To all whom it may concern:*

Be it known that I, MILLWARD T. THOMAS, citizen of the United States, residing at Warren, county of Warren, and State of Pennsylvania, have invented certain new and useful Improvements in Shaft-Clamps, of which the following is a specification, reference being had therein to the accompanying drawing.

This invention relates to a shaft clamp, and particularly to a construction adapted for coupling adjacent shafts together or for securing to the shaft a pulley or other object carried by the shell of the clamp.

The invention has for an object to provide a shell comprising axially separated members having clamping faces in close proximity to the division line of the members and with an intermediate portion spaced from the shaft whereby the clamping faces travel upon the periphery of the shaft when drawn toward the diameter thereof thus producing a wedging action at diametrically opposite points which does not mar or injure the shaft and firmly secures it to the shell or casing.

Other and further objects and advantages of the invention will be hereinafter set forth and the novel features thereof defined by the appended claims.

In the drawing:—Figure 1 is an elevation showing one form of the invention; Fig. 2 is a similar view of a modified form thereof, and Fig. 3 is a side elevation of the coupling casing.

Like numerals refer to like parts in the several views of the drawing.

The numeral 10 designates the shell or casing which may be formed of any desired size or configuration and is constructed of rigid nonresilient material. This shell is axially divided at 11 into opposite members which are secured and drawn together by bolts 12 or other connecting means. When used as a coupling the shells are extended as shown in Fig. 3 and provided with pressing ribs 13 of usual construction. The ends of the adjacent shafts 14 are disposed in this shell, and the inner periphery of each section thereof is provided adjacent to the divisional line of the shell with clamping faces 15 formed of substantially the same curvature as the periphery of the shaft and located at diametrically opposite points. These faces are disposed at a distance apart less than the diameter of the shaft taken through the axis thereof as at the point 16. Intermediate of the clamping faces the periphery of the shell is curved upon an arc receding from the periphery of the shaft to provide a clearance space 17 to permit the movement of the clamping faces toward each other and upon the periphery of the shaft.

In the modified form of the invention shown in Fig. 2 the construction is similar to that of Fig. 1 with the exception that the inner periphery 18 of the shell is of greater diameter throughout than the shaft 14 and has mounted thereon the clamping jaws 19 which comprise the equivalent of the faces 15 in Fig. 1 and are disposed in substantially the same position to travel upon the periphery of the shaft. With this construction the clamping faces may be changed for shafts of different diameters as will be obvious.

In the operation of the invention, the clamping faces being disposed in close proximity to the divisional line of the shell members and to the plane passing between said members and through the axis of the shaft are when placed under pressure caused to travel upon the periphery of the shaft toward its diameter at the axis thereof. The diametrically opposite clamping faces being spaced apart a distance less than the diameter of the shaft produce in their movement thereon a wedging and clamping action firmly connecting the shell with the shaft without marring or injuring the surface of the shaft. Such a construction also prevents the slipping which occurs where the clamping faces are disposed to bear toward the body of the shaft as the rigid character of the shell effects a tighter wedging hold which may be carried to any desired extent owing to the clearance space provided intermediate of the clamping faces to permit their travel upon the periphery of the shaft. The invention therefore presents a simple, efficient and economically constructed form of shaft clamp by which a positive connection between the parts may be secured without injury to either thereof.

Having described my invention and set forth its merits, what I claim and desire to secure by Letters Patent is:—

1. A shaft clamp comprising separated members each having upon their inner periphery clamping faces disposed adjacent to the divisional lines between the members and separated by an unobstructed clearance space extending from one face to the other upon each member to permit a travel of said faces upon the periphery of the shaft toward said divisional line.

2. A shaft clamp comprising separated members each having upon their inner periphery oppositely disposed clamping faces curved substantially to the arc of the shaft to which they are to be applied and disposed adjacent to the divisional line between said members, said faces being separated by an unobstructed clearance space extending from one face to the other upon each member to permit the travel of said faces upon the periphery of the shaft toward said divisional line.

3. A shaft clamp comprising separated members provided at their inner periphery with opposite clamping means disposed in close proximity to a plane passing between said means and through the axis of a shaft, said means being separated by a clearance space extending from one to the other and supported to travel upon the periphery of the shaft toward each other.

In testimony whereof I affix my signature in presence of two witnesses.

MILLWARD T. THOMAS.

Witnesses:
   DELFORD U. AEIRD,
   UNA M. THOMPSON.